(12) United States Patent
Baluta

(10) Patent No.: US 6,418,603 B1
(45) Date of Patent: Jul. 16, 2002

(54) MARGIN BLADE HOLDER ASSEMBLY

(75) Inventor: Doru Baluta, Windsor (CA)

(73) Assignee: Valiant Corporation (CA)

( * ) Notice: Subject to any disclaimer, the term of this patent is extended or adjusted under 35 U.S.C. 154(b) by 0 days.

(21) Appl. No.: 09/648,352

(22) Filed: Aug. 25, 2000

(51) Int. Cl.⁷ .................................................. B23Q 3/00
(52) U.S. Cl. ........................................ 29/281.5; 269/71
(58) Field of Search ............................... 269/71, 73, 77, 269/76, 75, 315, 45; 29/281.5; 33/169 R

(56) References Cited

U.S. PATENT DOCUMENTS 4,275,872 A * 6/1981 Mullis .......................... 269/77

* cited by examiner

*Primary Examiner*—Robert C. Watson
(74) *Attorney, Agent, or Firm*—Gifford, Krass, Groh, Sprinkle, Anderson & Citkowski, P.C.

(57) ABSTRACT

A margin blade holder assembly is disclosed in which the assembly includes a housing having a first part and a second part. An elongated margin blade has a first end swivelly secured to the second housing part such that the margin blade extends outwardly from the second housing part having the ability to axially rotate in it on a slight angle and has a free second end adapted for insertion into a gap. The housing parts are secured together by connecting arms so that the second housing part is movable in a direction perpendicular to the longitudinal axis of the margin blade relative to the first housing part between a first and second position. A spring resiliently retains the second housing part, and thus the margin blade, at an intermediate position between the first and second positions.

22 Claims, 3 Drawing Sheets

MARGIN BLADE HOLDER ASSEMBLY

BACKGROUND OF THE INVENTION

I. Field of the Invention

The present invention relates to a margin blade holder assembly.

II. Description of the Prior Art

In the manufacture of automotive vehicles, it is highly desirable that the spacing between movable body parts, such as the door panel of an automotive vehicle, be maintained within relatively precise dimensions. Consequently, during the manufacture of an automotive vehicle, a margin blade is typically inserted in the space or gap between two door panels or the door panel and a stationary body panel of the automotive vehicle prior to securing the door panel or the body panel to the automotive vehicle frame. These previously known margin blades are of a predetermined thickness, typically 5/32 of an inch thick, so that, once the door panel is secured to the vehicle frame, the space in between the door panel and its adjacent body frame is constant along the length of the junction between the door panel and the adjacent body panel. Typically, two margin blades are employed at spaced positions along the gap between the door panel and the adjacent body panel.

These previously known margin blades have been typically manually or automatically positioned in the gap between the door panel and the adjacent body panel. While effective in operation, this previously known method of manually positioning the margin blades between the door panel and the adjacent body panel is labor intensive and, therefore, expensive.

The already existing margin blade holders designed for automotive operation are not reliable and introduce both jamming occurrence during the introduction phase, resulting in line down time, and risk of damage for the outer panel skin hit by a misfitting margin blade.

The purpose of an automatic margin blade holder is to position the margin blade in the gap since the automotive vehicle, even when positioned on an assembly line, is not precisely positioned with respect to automated equipment adjacent the assembly line. As such, assuming that the position of the margin blade is fixed relative to the assembly line, the margin blade may be inaccurately positioned relative to the gap between the door panel and the adjacent stationary panel by as much as a quarter of an inch or even more. Consequently, upon activation of the automated equipment to transversely move the margin blade into the gap, the margin blade may contact either the door panel or the adjacent body panel and damage one or the other.

SUMMARY OF THE PRESENT INVENTION

The present invention provides a margin blade holder assembly which overcomes all of the above-mentioned disadvantages of the previously known devices.

In brief, the margin blade holder assembly comprises a housing having a first part and a second part. An elongated margin blade has a first end swivelly secured to the second housing part having the ability to axially rotate with a slight angle, and a second end which extends outwardly from the second housing part. This second end is pyramidally shaped and adapted for insertion into the gap between a door panel and an adjacent body panel.

The housing parts are secured together by two spaced apart arms. As such, the second housing part is movable in a direction perpendicular to a longitudinal axis of the margin blade relative to the first part between a first position and a second position. Furthermore, as the second housing part moves between its first position and second position, the longitudinal axis of. the margin blade remains parallel to a predetermined axis regardless of the lateral position of the margin blade between its first and second position.

A pair of stop blocks are mounted on the first housing part while an elongated bar secured to the second housing part has a portion positioned in between the stop blocks. The stop blocks thus limit the lateral movement of the second housing part relative to the first housing part between the first and second positions. Furthermore, one or more threaded members mounted to the stop blocks are aligned with the portion of the bar so that, by threadably adjusting the threaded fastener in the stop block, the precise position of the first and second positions of the second housing part, and thus the degree of movement of the second housing part between its first and second positions, may be adjusted. Additionally, a spring is preferably positioned between the stop blocks and bar in order to resiliently center the second housing part at an intermediate position between its first and second positions.

In use, the first housing part is secured to automated equipment, such as an air cylinder, such that, upon activation of the air cylinder, the air cylinder moves the margin blade holder between a retracted position and an extended position. In its retracted position, the margin blade holder is positioned away from a vehicle carried by an assembly line. Conversely, in its extended position, the air cylinder moves the margin blade holder so that the margin blade is positioned in the gap between the door panel (or other movable panel) and the adjacent body panel. However, since the second housing part, and thus the margin blade, is movable laterally by the relative movement between the first and second housing parts, the margin blade holder assembly automatically compensates for small differences in the precise position of the automotive vehicle on the assembly line. Additionally, in the preferred embodiment of the invention, the margin blade is pivotally mounted upon its own axis to the second housing part to compensate for angular mismatches between the margin blade holder and the gap between the door panel and adjacent body panel.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
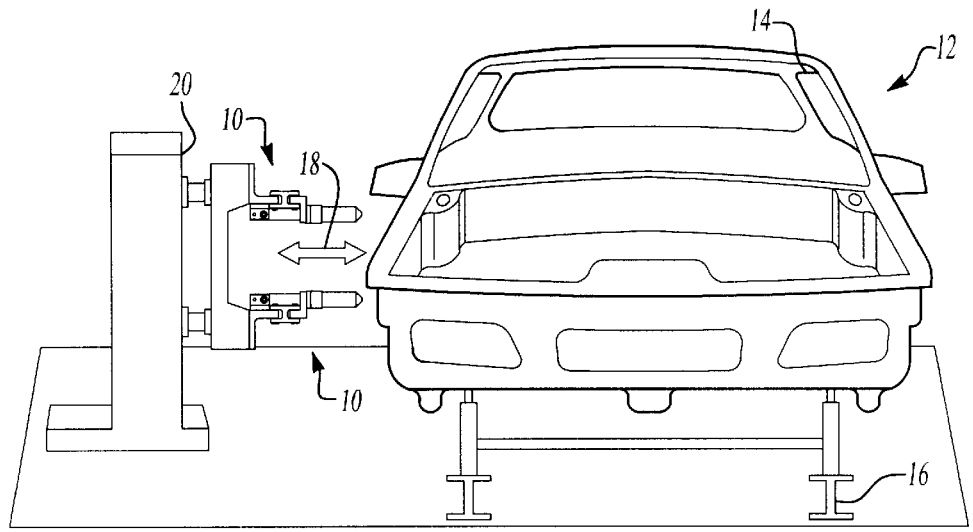
FIG. 1 is a front diagrammatic view illustrating a preferred embodiment of the margin blade holder assembly of the present invention for use with an automotive vehicle.
Figure 2:
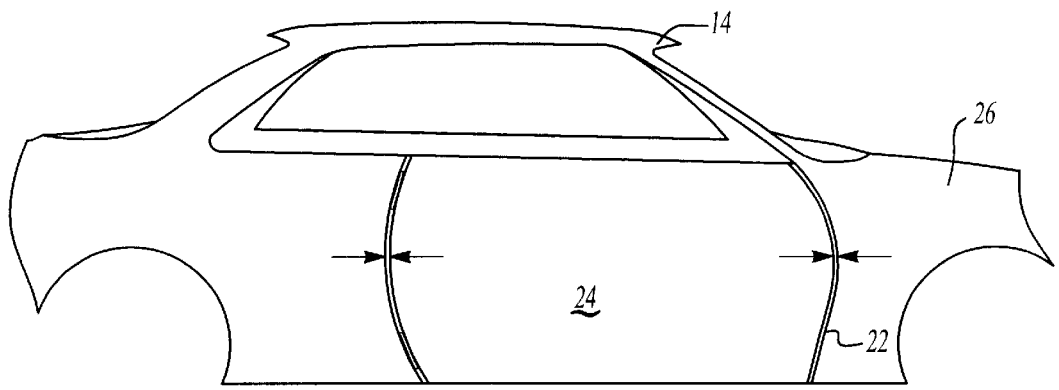
FIG. 2 is a side view illustrating an automotive vehicle on an assembly line.

With reference first to FIG. 1, a pair of margin blade holder assemblies 10 are there shown for use with an automotive assembly line 12 for automotive vehicles 14. In the well known fashion, the automotive vehicles 14 are conveyed down the assembly line 12 by any conventional conveying means 16 (illustrated diagrammatically) and are positioned so that the margin blade holder assemblies 10 are positioned to one side of the vehicle 14. However, as illustrated by arrow 18, an automatic mechanism 20 (such as an air cylinder) moves the margin blade holder assemblies 10 between a retracted position, illustrated in FIG. 1, and an extended position, in which the margin blade 11 is positioned within a gap 22 (FIG. 2) between a door or other movable panel 24 and adjacent body panel 26.

Figure 3:
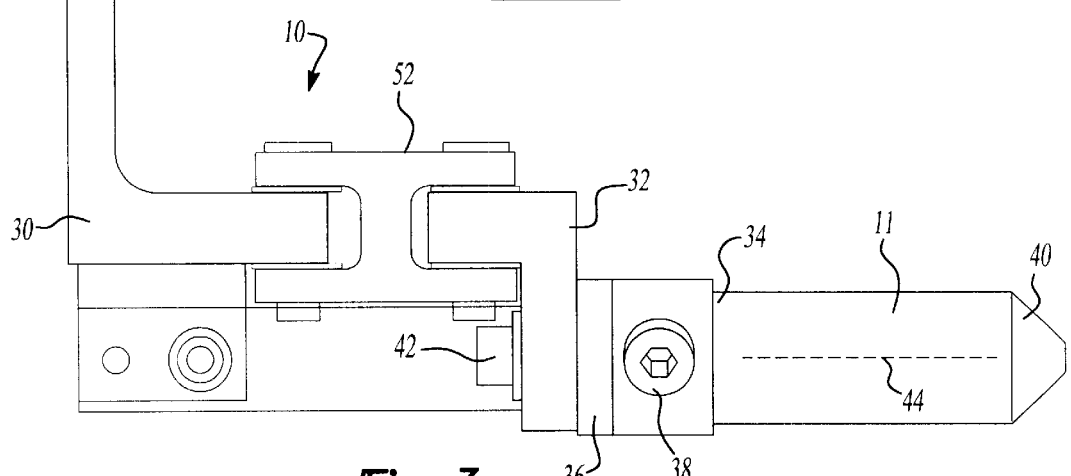
FIG. 3 is a side view illustrating a preferred embodiment of the margin blade holder assembly of the present invention.
Figure 4:
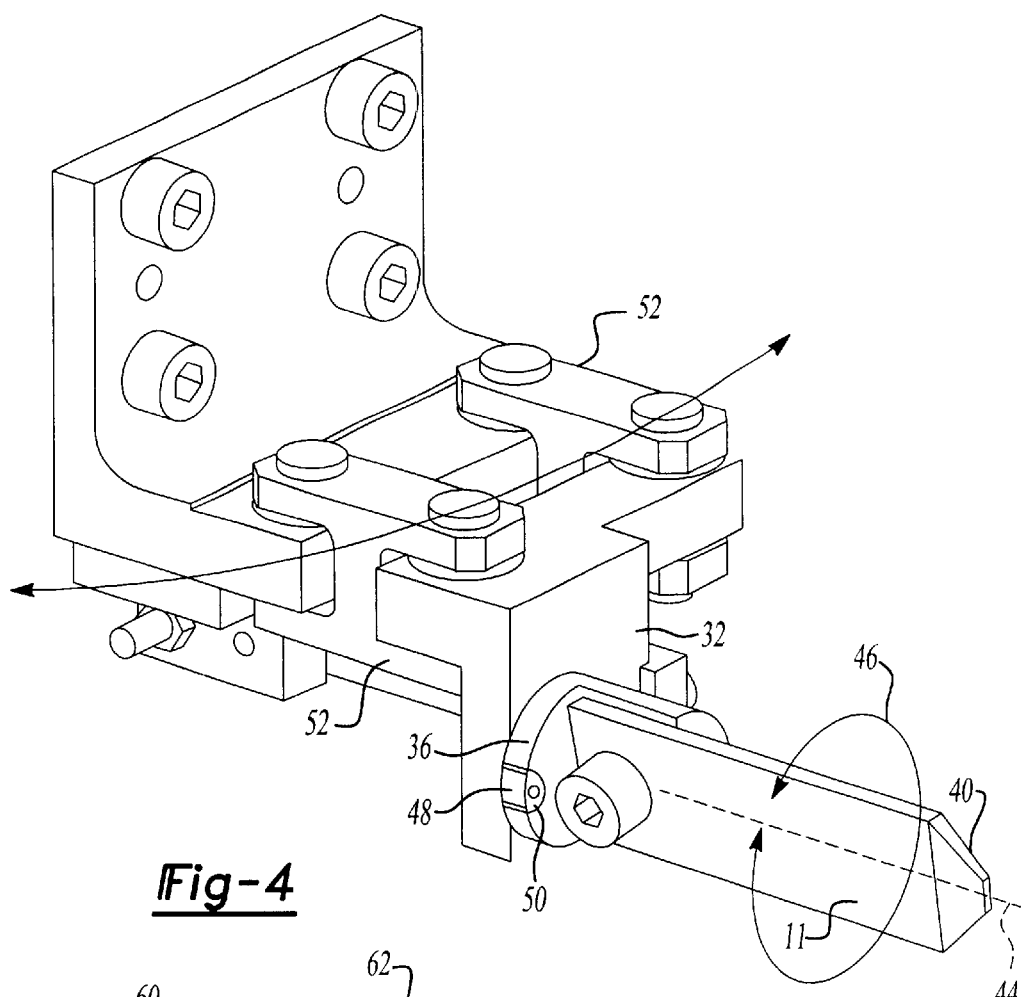
FIG. 4 is a perspective view illustrating the preferred embodiment of the margin blade holder assembly of the present invention.
Figure 5:
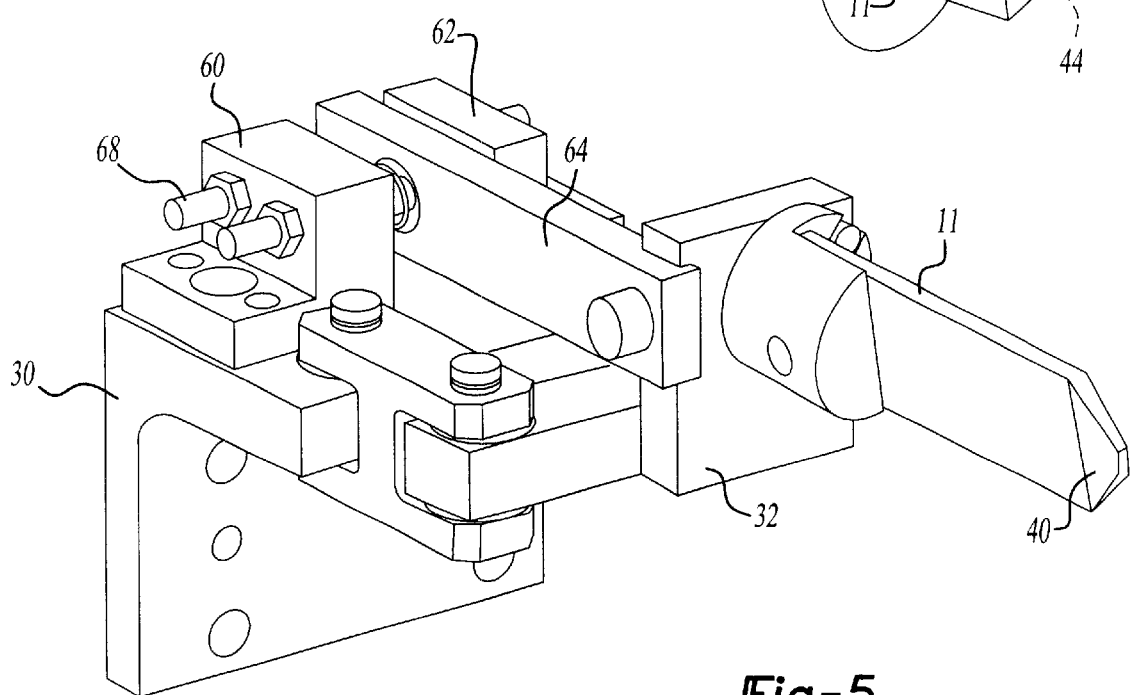
FIG. 5 is a bottom perspective view illustrating the preferred embodiment of the margin blade holder assembly of the present invention.

With reference now to FIGS. 3–5, the margin blade holder assembly 10 is there shown in greater detail. Each margin blade holder assembly 10 is substantially identical to the other so that only a single margin blade holder 10 will be described, it being understood that a like description will also apply to the other margin blade holder 10.

With reference then to FIGS. 3–5, the margin blade holder assembly 10 includes a first housing part 30 and a second housing part 32. The margin blade 11 has a first end 34 secured to a boss 36 by a threaded fastener 38. Different thicknesses of margin blade can be selected to accommodate a specific preset gap. The margin blade 11, furthermore, extends laterally outwardly from the second housing part 32 and includes a free end 40 which is pyramidally shaped. As such, the width of the end 40 of the margin blade 11 is less than the width at the other end 34 of the margin blade 11.

Still referring to FIGS. 3–5, the boss 36 is preferably secured to the second housing part 32 by a longitudinally extending fastener 42 so that the boss 36, together with its attached margin blade 11, can pivot about the longitudinal axis 44 as indicated by arrows 46 (FIG. 4). However, as best shown in FIG. 4, a pin 48 is secured to the second housing part 32 and this pin 48 is positioned within a slot 50 formed in the boss 36 at a position radially spaced from the pivotal axis of rotation of the boss 36. Furthermore, the circumferential width of the pin 48 is less than the circumferential width of the slot 50 so that the pin 48 limits the pivotal movement of the margin blade 11 to a few degrees of pivotal movement.

A pair of H-shaped connecting arms 52 pivotally secure the first housing part 30 to the second housing part 32. These connecting arms 52 are substantially identical to each other and are spaced apart and parallel to each other. As such, the connecting arms 52, together with the first housing part 30 and second housing part 32, form a parallelogram.

Figure 6:
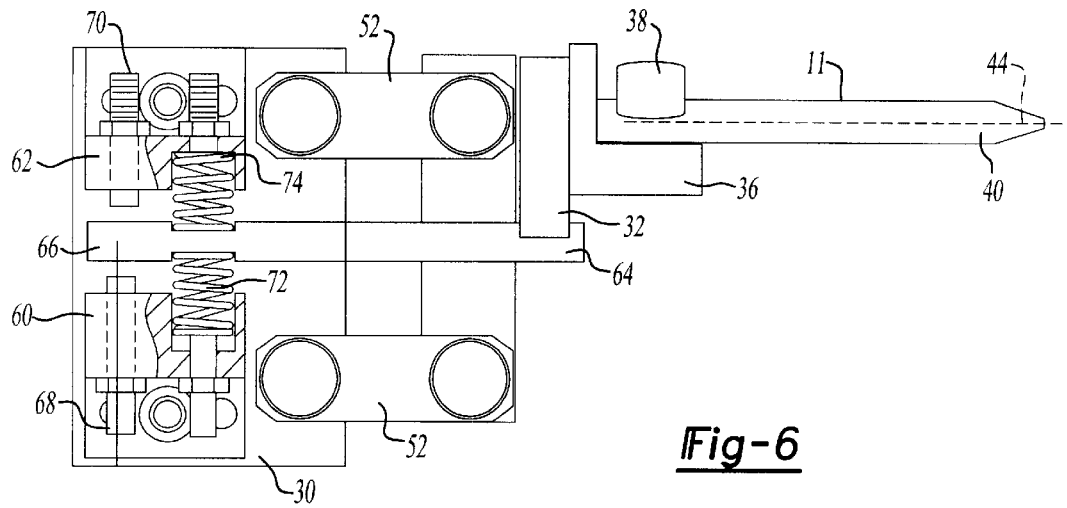
FIG. 6 is a top view illustrating the preferred embodiment of the margin blade holder of the present invention.
Figure 7:
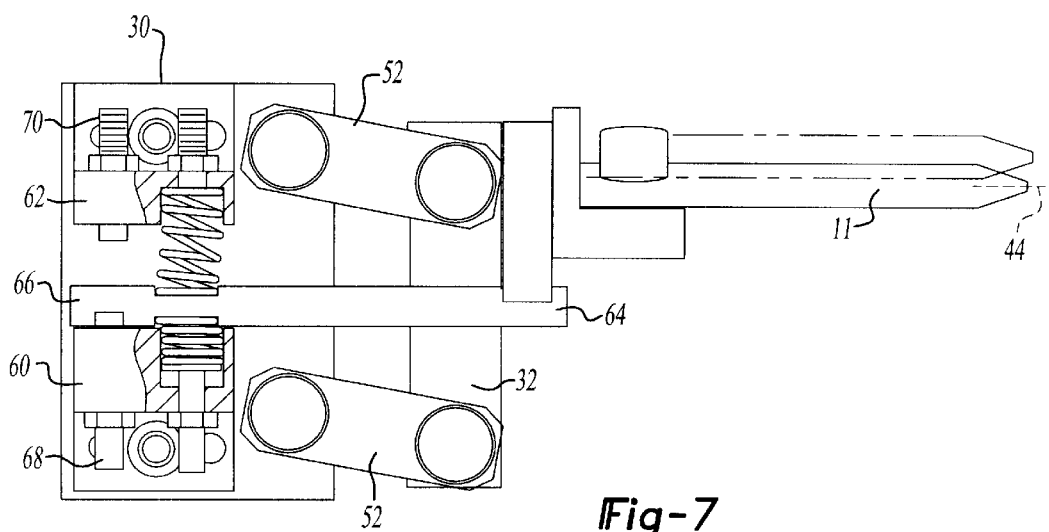
FIG. 7 is a view similar to FIG. 6, but illustrating the margin blade holder in a laterally displaced position.

With reference now to FIGS. 6 and 7, the connecting arms 52 permit the second housing part 32 with its attached margin blade 11 to laterally move relative to the first housing part 30 between, for example, the position shown in FIG. 6 and the position shown in FIG. 7. In doing so, however, the longitudinal axis 44 of the margin blade 11 remains parallel to its initial position regardless of the lateral position of the second housing part 32 relative to the first housing part 30. As such, the angle between the longitudinal axis 44 of the margin blade 11 and the first housing part 30 remains fixed regardless of the lateral position of the second housing part 32 relative to the first housing part 30.

With reference now particularly to FIGS. 5–7, a pair of spaced apart blocks 60 and 62 are secured to the first housing part 30 by any conventional means so that the blocks 60 and 62 are spaced apart and parallel to each other. An elongated bar 64 has one end secured to the second housing part 32 so that a portion 66 of the other end of the bar 64 is positioned in between the blocks 60 and 62. Threaded fasteners 68 and 70 are then threadably secured to the blocks 60 and 62, respectively, so that an end of each fastener 68 and 70 is aligned with the portion 66 of the bar 64. Consequently, by adjusting the axial position of the fasteners 68 and 70, the degree of lateral movement of the second housing part 32, and thus of the margin blade 11, is limited between a first and second position defined by the position of the fasteners 68 and 70 when they abut against the bar portion 66.

With reference now particularly to FIG. 6, a pair of springs 72 and 74 are respectively mounted to the blocks 60 and 62 such that the springs 72 and 74 are sandwiched in between the blocks 60 and 62 and the bar portion 66. The springs 72 and 74 thus serve to resiliently maintain the position of the second housing part 32 at an intermediate point between its first and second positions.

With reference again to FIGS. 1 and 2, in operation, with the margin blade holder assemblies 11 in their retracted positions the vehicle 14 is moved to a predetermined position relative to the margin blade holder assemblies 10. In doing so, the gaps 22 (FIG. 2) between the door panel 24 and body panel 26 are positioned substantially in line with the margin blades 11 held by the margin blade holder assemblies 10.

Upon activation of the automatic means 20, the automatic means 20 extends the margin blade holder assemblies 10 towards the vehicle 14 such that the pyramidal end 40 of the margin blade 11 protrudes inwardly into the gap 22. The margin blade 11 laterally deflects as required by relative movement of the housing parts 30 and 32 relative to each other, as well as slightly pivotally rotate about the fastener 42 in order to obtain a snug fit between the door panel 24 and adjacent body panel 26. The body panel 26 is then secured to the vehicle body 14 so that, upon retraction of the margin blades 11 from the gap 22, a uniform gap 22 of a preset width is achieved between the door panel 24 and adjacent body panel 26.

From the foregoing, it can be seen that the present invention provides a simple and yet effective means for automatically supporting and positioning margin blades 11 in gaps between adjacent body panels. Having described my invention, however, many modifications thereto will become apparent to those skilled in the art to which it pertains without deviation from the spirit of the invention as defined by the scope of the appended claims.

I claim:

1. A margin blade holder assembly comprising:
    a housing, said housing having a first part and a second part;
    an elongated margin blade having a first end secured to the second housing part and a second free end;
    said second housing part being pivotally connected to said first housing part so that said second housing part is freely movable in a direction perpendicular to a longitudinal axis of said margin blade relative to said first housing part between a first position and a second position.

2. The margin blade holder assembly of claim 1 wherein said margin blade is thinner at said free end than at said second end.

3. The margin blade holder assembly of claim 2 wherein said margin blade can be exchanged for a specific thickness to accommodate a given preset gap.

4. The margin blade holder assembly of claim 3 wherein said free end of said margin blade is pyramid shaped.

5. The margin blade holder assembly of claim 1 further comprising means for pivotally connecting said margin blade to said second housing part about an axis parallel to the longitudinal axis of said margin blade.

6. The margin blade holder assembly of claim 5 wherein said pivotal connecting means comprises:
  a boss, said margin blade rigidly secured to said boss, said boss having an opening extending parallel to said longitudinal axis and radially spaced from said predetermined axis;
  means for attaching said boss to said second housing part so that said boss is able to pivot about said longitudinal axis; and
  a pin secured to said second housing part and positioned in said opening, said pin having a circumferential width relative to said longitudinal axis less than the circumferential width of said opening relative to said longitudinal axis.

7. The margin blade holder assembly of claim 1 further comprising means for adjusting said first position.

8. The margin blade holder assembly of claim 7 and comprising two spaced apart blocks rigidly connected to said first housing part, wherein said second housing part includes an elongated bar which extends towards said first housing part and includes a portion positioned between said blocks, and at least one threaded member threadably connected to at least one of said blocks, and aligned with said portion of said bar.

9. The margin blade holder assembly of claim 8 and further comprising means for resiliently centering said second housing part at an intermediate position between said first and second positions.

10. The margin blade holder assembly of claim 9 wherein said centering means comprises at least one spring positioned between at least one of said blocks and said portion of said bar.

11. The margin blade holder assembly of claim 7 further comprising means for adjusting said second position.

12. The margin blade holder assembly of claim 1 wherein said connecting means comprise two connecting arms, each of said connecting arms being pivotally connected at one end of said connecting arm to said first housing part and at the other end of said connecting arm to said second housing part.

13. The margin blade holder assembly of claim 12 wherein said connecting arms are each H-shaped.

14. The margin blade holder assembly of claim 13 wherein said connecting arms are parallel to one another and of equal lengths between their respective connections to said first housing part and said second housing part.

15. A margin blade holder assembly comprising:
  a housing, said housing having a first part and a second part;
  an elongated margin blade having a first end secured to the second housing part and a second free end;
  means for connecting said housing parts together so that said second housing part is movable in a direction perpendicular to a longitudinal axis of said margin blade relative to said first housing part between a first position and a second position;
  means for pivotally connecting said margin blade to said second housing part about an axis parallel to the longitudinal axis of said margin blade;
  wherein said pivotal connecting means comprises:
    a boss, said margin blade rigidly secured to said boss, said boss having an opening extending parallel to said longitudinal axis and radially spaced from said predetermined axis;
    means for attaching said boss to said second housing part so that said boss is able to pivot about said longitudinal axis; and
    a pin secured to said second housing part and positioned in said opening, said pin having a circumferential width relative to said longitudinal axis less than the circumferential width of said opening relative to said longitudinal axis.

16. A margin blade holder assembly comprising:
  a housing, said housing having a first part and a second part;
  an elongated margin blade having a first end secured to the second housing part and a second free end;
  means for connecting said housing parts together so that said second housing part is movable in a direction perpendicular to a longitudinal axis of said margin blade relative to said first housing part between a first position and a second position;
  means for adjusting said first position; and
  two spaced apart blocks rigidly connected to said first housing part, wherein said second housing part includes an elongated bar which extends towards said first housing part and includes a portion positioned between said blocks, and at least one threaded member threadably connected to at least one of said blocks, and aligned with said portion of said bar.

17. The margin blade holder assembly of claim 16 and further comprising means for resiliently centering said second housing part at an intermediate position between said first and second positions.

18. The margin blade holder assembly of claim 17 wherein said centering means comprises at least one spring positioned between at least one of said blocks and said portion of said bar.

19. A margin blade holder assembly comprising:
  a housing, said housing having a first part and a second part;
  an elongated margin blade having a first end secured to the second housing part and a second free end;
  means for connecting said housing parts together so that said second housing part is movable in a direction perpendicular to a longitudinal axis of said margin blade relative to said first housing part between a first position and a second position;
  means for adjusting said first position; and
  means for adjusting said second position.

20. A margin blade holder assembly comprising:
  a housing, said housing having a first part and a second part;
  an elongated margin blade having a first end secured to the second housing part and a second free end;
  means for connecting said housing parts together so that said second housing part is movable in a direction perpendicular to a longitudinal axis of said margin blade relative to said first housing part between a first position and a second position;
  wherein said connecting means comprise two connecting arms, each of said connecting arms being pivotally connected at one end of said connecting arm to said first housing part and at the other end of said connecting arm to said second housing part.

21. The margin blade holder assembly of claim 20 wherein said connecting arms are each H-shaped.

22. The margin blade holder assembly of claim 21 wherein said connecting arms are parallel to one another and of equal lengths between their respective connections to said first housing part and said second housing part.

* * * * *